May 26, 1970 V. HECHLER IV 3,513,869
FLOW CONTROL OF FLUID PROPORTIONING DEVICE
Filed March 22, 1967 2 Sheets-Sheet 1

INVENTOR.
VALENTINE HECHLER IV.
BY
ATTYS

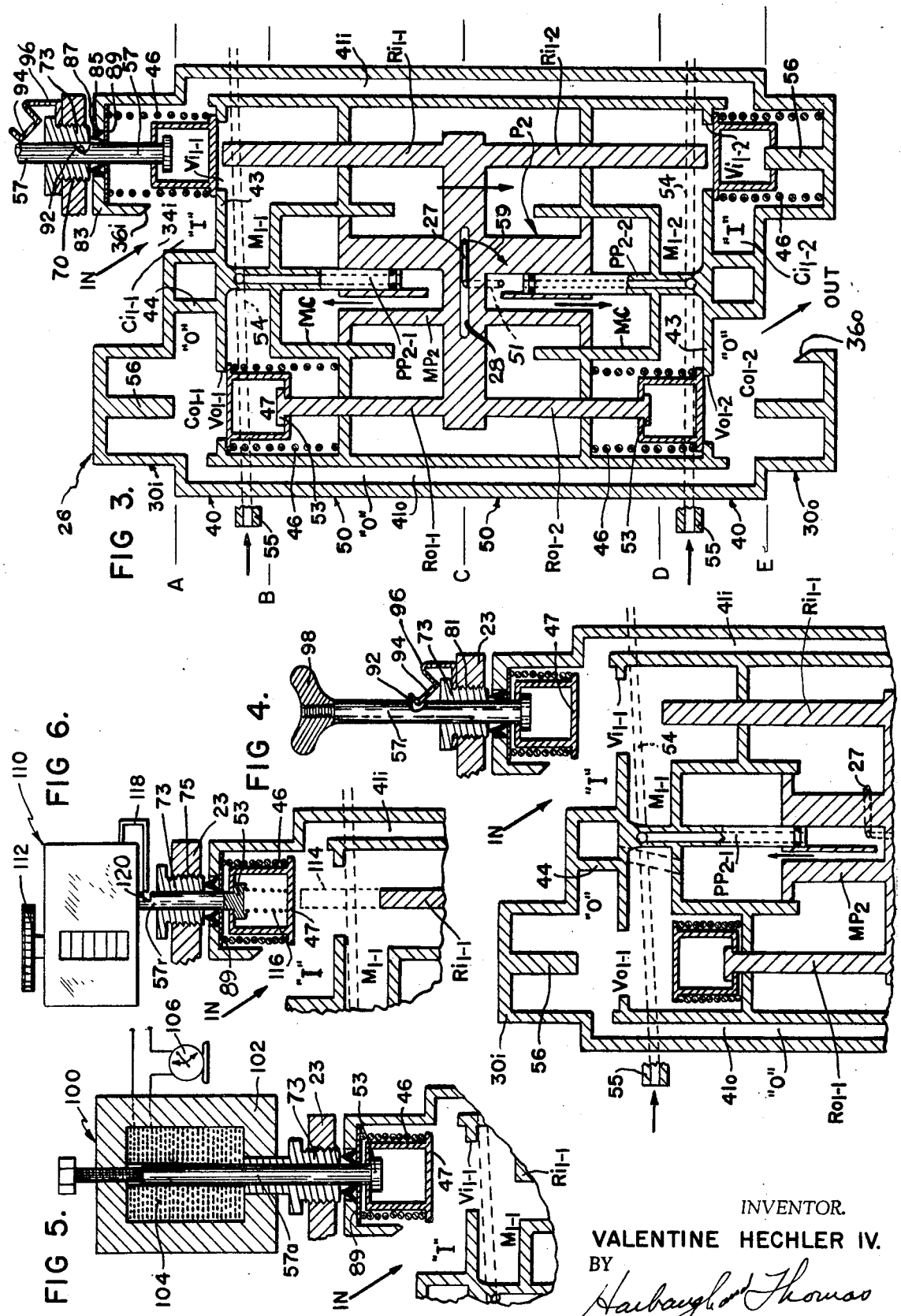

United States Patent Office 3,513,869
Patented May 26, 1970

3,513,869
FLOW CONTROL OF FLUID PROPORTIONING DEVICE
Valentine Hechler IV, 26 Meadow View Lane,
Northfield, Ill. 60093
Continuation-in-part of application Ser. No. 520,568,
Jan. 14, 1966. This application Mar. 22, 1967, Ser.
No. 625,086
Int. Cl. G05d 11/03; G01f 11/04
U.S. Cl. 137—99                      14 Claims

ABSTRACT OF THE DISCLOSURE

A flow control valve arrangement in a fluid proportioning device in which a liquid pressure intake valve is positively restrained in open position to hold a liquid driven piston in a stationary position and stop the pumping of a chemical concentrate for mixture therewith, and to open its exhaust valve for the flow of pressure directly from the inlet to the outlet through a manifold interconnecting the valves whereby unrestricted flow from inlet to outlet without injection of concentrate thereto may be had at will.

CROSS REFERENCE

Figure 1:
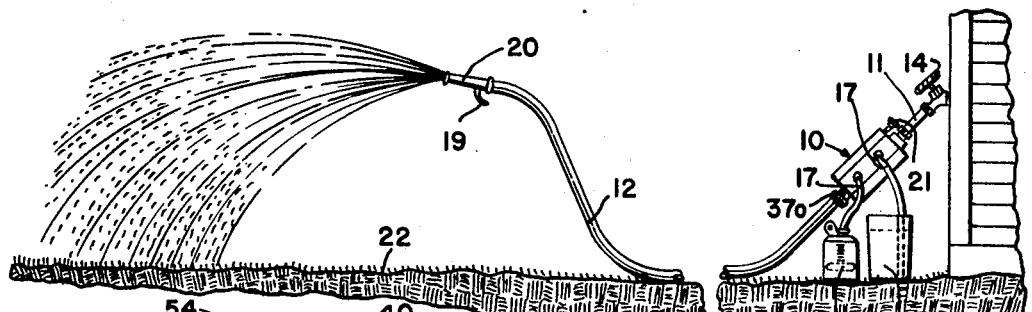

The present invention is a continuation-in-part and improvement upon my application Ser. No. 520,568 filed Jan. 14, 1966, hereby expressly incorporated by reference herein.

BACKGROUND OF IMPROVEMENT

The present invention is an improvement upon the apparatus disclosed in said application in which municipal water pressures are utilized in mixing and applying at any flow rate desired on exact ratio solution of a wide range of chemicals for three dimensional applications. The apparatus is used either in plumbing ahead of a faucet or beyond the faucet at either end of a garden hose connected to the faucet for dispensing the solution with little if any sacrifice of water pressure necessary to operate the apparatus. The apparatus is constructed to provide a positive proportional flow of liquids when the flow is in an intended direction but if inadvertently reversely connected the flow in the reverse direction in the apparatus holds the chemical pump valves closed while opening the motor valves for free flow of the water without actuating the motor parts. From time to time it is desirable to supply the water without the chemical before or after the application of mixtures. A valving system for reversing the flow through the system is complicated and cumbersome for a hand held apparatus.

SUMMARY OF INVENTION

The present invention is concerned with a simple construction and fluid motor system wherein by manually or by time clock or meter control, opening one of the intake motor valves of the piston system to force the controlled piston to open an exhaust valve adjacent to it and establish a free flow path from inlet to outlet without operation of the motor and pump so that intermittent dispensing of diluent by itself and a diluent-chemical mixture may be accomplished instantly with a single simple control without any change of connections or parts.

Although the invention may be used by anyone for many purposes, it will be described as a horticultural aid to home owners unskilled in handling chemicals, in wet applications, for lawn and garden care in the fertilizing and control of weeds, fungus, pests, etc., it is not to be limited thereto since it has many readily recognized applications in agriculture, parks, industry, schools and laboratories.

One of the objects of the invention is to provide improved means for intermittently supplying a chemical to a stream of flowing water with a high degree of proportional accuracy and mixing turbulence and with pulse free flow over a wide range of flow rates without loss of chemical or contamination of the water during idle periods or when dispensing water alone.

A further object contemplates a limited exposed area contacted by chemicals in the pump which can be effectively closed when the motor and pump is not working, can be effectively flushed clean in seconds for change of chemicals, and automatically primes itself and prevents vapor lock occurring in the chemical supply conduit.

Furthermore, devices embodying the invention for garden hoses can be located at either the faucet or nozzle end of a garden hose, and if at the nozzle end, the device along with the nozzle and chemical supply can be carried and manipulated by an individual for alternate dispensing operations for long periods of time with comparatively little fatigue.

Figure 7:
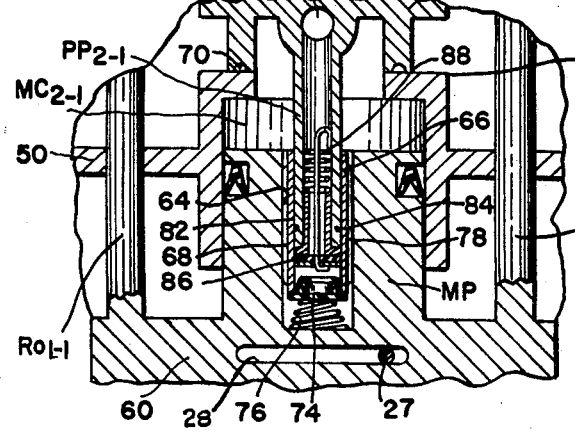
Figure 8:
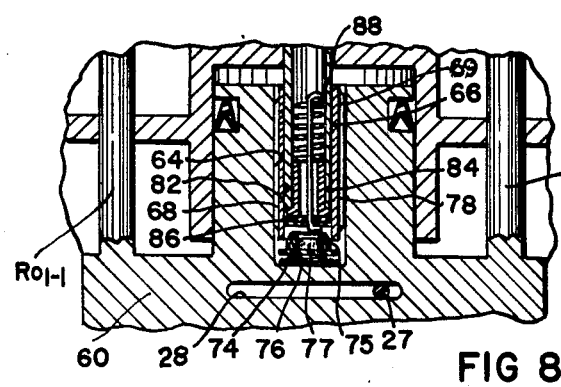
Figure 2:
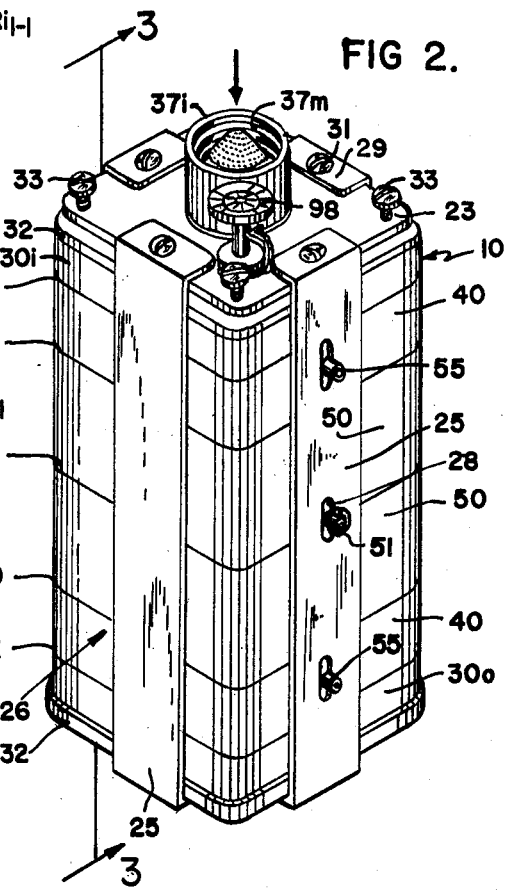
Figure 9:
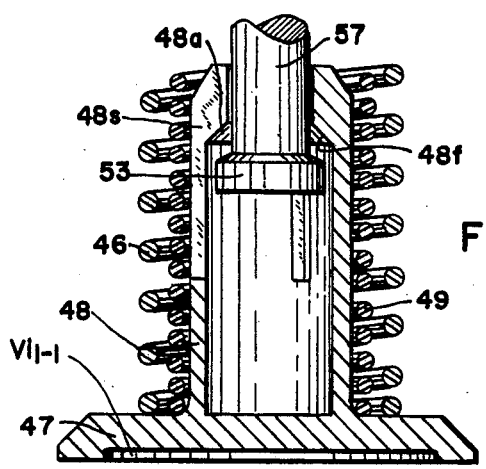

In the drawings:
FIG. 1 is a diagrammatical picture view of the device embodying the invention used for lawn care;
FIG. 2 is a perspective enlarged view of the motor-pump device embodying the invention for mixing chemicals in water;
FIG. 3 is a diagrammatical representation of the relationship of the motor and pump pistons and valves as taken on line 3—3 of FIG. 2 in normal mixing operation;
FIG. 4 is a diagrammatical representation of the relationship of the working parts when water alone is dispensed through the device as controlled manually;
FIG. 5 is a diagrammatical showing similar to FIG. 4 indicating how the by-pass control can be accomplished automatically by solenoid and time clock;
FIG. 6 is a diagrammatical showing similar to FIG. 5 indicating how the quantity dispensed can be counted by valve movement and the valve locked when a predetermined count is reached;
FIGS. 7 and 8 are longitudinal sections through the pump valves of the arrested motor piston when dispensing water alone; and
FIG. 9 is an enlarged axial section through the diluent flow control motor valve, all being alike.

For a better understanding of the description it may be well to characterize fluids and the working parts of the apparatus in relation to their functions. A diluent is generally water while the concentrate is any chemical of predetermined concentration that is to be diluted in exact proportions for dispensing. The diluent flowing under pressure actuates a motor having flow responsive motor pistons MP which in turn operate pumps having pump pistons PP to aspirate and inject exact portions of the concentrate into the diluent under pressure. Backflow relates to an undesired flow in the opposite direction. The diluent pressure is the gauge pressure at the inlet of the device and the mixture pressure is the gauge pressure as measured at the outlet of the device under exactly the same flow discharge restrictive conditions. Pressure drop in the line relates to pressure drop in a conduit such as a garden hose which would occur with or without the embodiment in it. The capital letters identify like elements while like suffix numerals identify functional grouping of elements throughout the views so that the cooperation of the elements, assemblies and components can be better understood in the description of the drawings.

In this connection, it may be particularly noted that the letter "I" and suffix $i$ are used to denote functions concerned with "inlet" or incoming diluent, while the letter "O" and suffix $o$ denote functions concerned with "output" or outgoing diluent. Furthermore, the system of all compartments and passages identified with the letter I in FIG. 3 are in continuous open connection with one another through passages $36i$ and $41i$ in the blocks 30, 40 and 50, and the system of all compartments and passages identified with the letter "O" are in open communication with one another through passages $36o$ and $41o$ in the housing 26.

With these terms in mind the invention is characterized in its preferred apparatus embodiment shown in said application by four motor pistons MP only two of which need be shown here, each having a pump cylinder PC in its head cooperating with stationary pump pistons PP extending inwardly from the motor cylinder heads whereby motor input of diluent and pump intake of concentrate occur simultaneously, and the output of the diluent and exhaust of the concentrate occur simultaneously for progressive mixing directly in the motor cylinder MC on each exhaust stroke. The four motor and pump pistons for each pairing are referred to generally as $PP_2$ and $MP_2$ herein when their respective functions as pump and motor pistons are under consideration. The four motor pistons are integrated in pairs which act alternatively in opposite directions with the valve action controlled by the other pair the valving for the pair of motor cylinders $MC_2$ shown herein is controlled by the movement of the other pair of pistons not shown. Oppositely moving motor input valves $Vi$ and motor output valves $Vo$ for their respective motor pistons are self-closing to direct the flow of diluent to and from the respective motor cylinders but open with the backflow of diluent through them to avoid reverse flow actuation of the motor pistons. Each pump is provided with tandem self-closing output and intake pump valves 74 and 86, respectively (FIGS. 7 and 8) that close against the backflow of concentrate therethrough to prevent flow of diluent into the concentrate intake passageway 54.

Moreover, for ease of assembly and inventory, the inlet valves $Vi$ for each pair of motor pistons MP are identical with the outlet valves $Vo$ of the other pair of motor pistons MP. Preferably the head of each motor piston MP is approximately four times the area of a valve port V and of the diluent inlet or outlet openings "IN" and "OUT" (FIGS. 3–6) in the motor housing for handling one-fourth of the mixture output each cycle in overlapping relationship with other pistons so that the flowing volume of diluent within the housing 26 and in the flow channels is constant without pulsations at all times for any rate of flow. A yoke 27 having two cranks interconnects the two pairs of motor pistons to assist the hydraulics of the system in maintaining their reciprocation in 90° phased relationship but without a constant rotational velocity of the cranks, the crank element being strong, but of light weight for this purpose to avoid any flywheel action.

Preferably, an external manifold with a single connection is provided for the concentrate. However if desired, the manifold can be removed and separate concentrate openings 55 are provided for the internal manifolds of those pairs of pumps that are laterally adjacent to each other so that two different ratios of mixtures can be dispensed merely by connecting the concentrate supply to only one or to both of the two pump inlets, or, two different concentrates can be connected to the different inlets as shown in FIG. 1, and if desired be separately valved for selective or composite use at the will of the operator.

Referring now to the drawings in further detail an application of the inventive concept is demonstrated at 10 in FIGS. 1 and 2 as used at either end of a garden hose 12 and is supplied with municipal water from a valved water tap 14 preferably through a short section of flexible hose 11. Concentrate is drawn from an open container 16 or a closed container nut 18, or both. A nozzle with a quick shut-off valve 19 is shown at 20 to spray the mixture on lawn 22. The concentrate in container 16 can be a fertilizer with or without growth or selective plant control additives while the concentrate content of the container 18 may be for pest control. In FIG. 1 two supplies of concentrate from containers 16 and 18 are shown as separately connected to the device by hoses 17.

A short length of hose 11 is preferably employed between the device and the house to yield to lateral hose strains and eliminate any sound conduction to the house pipe system. Means is provided as indicated at 21 for controlling the flow of diluent selectively with or without concentrate.

The device 10 preferably is constructed for in-line connection with the garden hose 12 and includes as shown in FIGS. 2 and 3, an external construction generally square cross-sectionally. There are six housing members, two identical head or end blocks 30, two identical valve transfer blocks 40 and two identical cylinder blocks 50 all molded of chemically impervious plastic. There are two identical combination motor piston and pump cylinder units 60, one being shown in FIGS. 3–6 that are coordinated for operation in stepped relationship by means of a 90° Scotch yoke crank element 27 (FIG. 3) journalled between the cylinder blocks 50 for operation in cross slots 28 provided in the piston units 60.

As shown in FIG. 3, the housing units are externally clamped together between metal endplates 23 as contracted by longitudinal straps 25, at least one of the endplates having a threaded opening 70 as shown in FIGS. 3–6. The straps have cusps 29 at opposite ends which overlie the remote faces of the endplates where they are secured thereto by suitable means such as screws 31. A vise member 32 is preferably interposed between the bottom head block $30o$ and the lower endplate 23 but is shown herein at the top end for clearness of disclosure. The blocks are squeezed and held clamped as a sealed unitary device by clamp screws 33 that are threaded through the endplate 23 to terminally engage the vise member and displace it inwardly.

As constructed and oriented with the valve arrangement to be described, the upper head 30 serves as an inlet head $30i$ and the lower head serves as an outlet head $30o$ (FIG. 3). Both heads are identical in that each has a circular recess connected to the other sides of the blocks by open passages $36i$ and $36o$.

The inlet head $30i$ however is equipped with a swivel female coupling $37i$ so that it can be tightened at its internally threaded mouth $37m$ into sealing relationship with a male garden hose connector member.

The outlet end $30o$ is similarly provided with a male hose bushing connector $37o$ receiving the female connector of the garden hose 12. These connectors serve also to indicate proper conventional orientation of the water connections for correct direction of flow of water. Suitable wording can also be provided on the hose connecting bushings to indicate direction of flow.

It is to be noted that the two heads 30 are identical and, with the respective valve blocks 40 assembled thereto, they provide compartments $34i$ and $34o$ at the top and bottom, respectively (FIG. 3). These compartments communicate with compartments $Co_1$ and $Ci_1$, respectively, it being further noted that passages $41o$ interconnect the two $Co$ compartments namely $Co_{1-1}$ and $Co_{1-2}$ while passage $41i$ interconnects the two $Ci$ compartments, namely $Ci_{1-1}$ and $Ci_{1-2}$. The passages $41i$ and $41o$ are shown diagrammatically outside the housing 26, in FIG. 3, but they are actually interior thereof.

Each valve assembly block 40 has two valve ports through the common cross wall 43 with partitions 44 arranged on opposite sides of the wall so that with each block 40 the outer sides of the ports $Vo_1$ and $Vi_1$ (compartment $Co_1$ and $Ci_1$) are isolated by the partition 44 and are in communication separately with systems "O" and "I" respectively. These ports however on their inner sides of cross walls 43 are in communication with each other through manifolds $M_1$, namely, $Vo_{1-1}$ and $Vo_{1-1}$ through $M_{1-1}$ and $Vo_{1-2}$ and $Vi_{1-2}$ through $M_{1-2}$.

It will be appreciated in this connection, that the lower half of FIG. 3 is symmetrically arranged with the upper half just described, with the last numerals in the legends changed from "1" to "2." Either end could be modified as hereinafter described.

The structure and operation of the valves referred to by the same identification as the ports with which they are associated, are lost motion poppet valves of like construction. They control the flow of diluent from the inlet to the outlet through the motor passages. As shown in structural detail in FIG. 9, each comprises a valve head 47 and a stem 48 that is externally cylindrical to receive a light sleeve 49 of metal made preferably of comparatively closely wound spring coils which can easily be held to close tolerances. The length of the sleeves 49 is substantially greater than the distance of the valve throw to hold them in place. The stem terminally defines radially flexing fingers 48f which terminally have inwardly offset shoulders 48s which are held against flexing outwardly by the sleeve when the sleeve is in place.

Valve actuating rods R are reciprocated by the pistons whereby the valves are actuated only during a minor portion of the rods. When the valve body is mounted to be pulled open as shown by valves $Vo_1$, pull rods $Ro_1$ are provided with heads 53 which are received past the valve stem shoulders 48, which flex outwardly for reception thereof when the sleeve 49 is withdrawn. The assembled working relationship is maintained by returning the sleeve to the position shown in FIG. 9. The valves $Vi_1$ are pushed open by push rods $Ri_1$ while valve $Vi_{1-1}$ is also pulled open by a manually actuated rod 56r.

It will be noted that with the valve blocks 40 separating from the cylinder blocks 50 at lines B and D and the pull rod $Ro_1$ fully advanced towards the valve head 47, the valve body can be moved outwardly a further distance, more than enough to release and apply the sleeve 49, for release and installation of the valves.

The same valve member can be used with spring and sleeve for the push open valve $Vi_{1-2}$. A control stud 56 is provided in the back cap space of the valve of a diameter which slides freely through the fingers 48f in guided relationship with the sleeve 49 in place. In this instance push rods $Ro_1$ and $Ri_1$ engage the face of the valve head 47 to open it outwardly. These rods $Ri$ and $Ro$, respectively, are integrally formed with the motor piston MP, and it will be observed that one group of valve rods operate alternately to push valves open and the other operates alternately to pull valves open.

In the valve system provided one of the valves in each manifold is located on the manifold side of the port while the other valve for each manifold is located on the opposite side of the wall 43. The valves at opposite ends of the housing that are directly opposite each other, axially, open in opposite directions, it being noted that the valves are so arranged that all valves close in the direction of flow of diluent through the housing so that the action of the pistons is assured, while all valves open with flow in the unintended direction of flow to prevent piston actuation flow through the cylinders.

If both piston units MP were in dead center, none of the valves would be open. They would all be closed. However, in motor resting conditions as shown diagrammatically in FIG. 3, the Scotch yoke 27 interdrive precesses movement of the poston unit (not shown) ahead of the piston unit $MP_2$ with an arcuate advance of 90° indicated by broken line 51 of the control crank 27. Thereby, when either piston unit is at its mid point the other piston unit is at one limit of its excursion under a set of conditions in which the midpoint piston unit MP is being powered by diluent at one end and diluent is being exhausted at the other end through the valve controlled by the other piston unit.

Accordingly, with the inlet 36i and outer chamber $Ci_{1-1}$ connected by passage 41i to chamber $Ci_{1-2}$, and the outlet 36o and outer chamber $Co_{1-2}$ connected to chamber $Co_{1-1}$ it will be appreciated that when the other piston unit (not shown) actuates its valves to propel pistons $MP_2$ downwardly, as shown by the arrow 59 related to the crank 27, to their lower limit said other piston unit (not shown) will assume their midportion with all the valves controlled by it in their closed positions to control the reversing action of the piston unit $MP_2$ shown. Said other piston unit has been driven by intake valve $Vi_{1-2}$ which is now pushed open to apply inlet pressure thereto, and exhaust valve $Vo_{1-1}$ is now pulled open to exhaust the other side to the outlet. However, as seen in FIG. 4, in this lower position of the piston $MP_2$ if the inlet valve $Vi_{1-1}$ is manually pulled open, the flow of incoming water will pass therethrough and through the manifold $M_{1-1}$, out through the already open valve $Vo_{1-1}$, through the passage 41i, and out through outlet 36o, thus tending to equalize pressure at the open valves $Vo_{1-1}$ and $Vi_{1-2}$ that control the other piston unit.

With the other piston unit (not shown) having balanced inlet pressures on opposite sides at the mid point of its stroke, when all the valves controlled by it are closed, no effective pressure differential is exerted across the pistons $MP_2$ and the motor pistons stop moving as long as valve $Vi_{1-1}$ remains open. Whenever the valve $Vi_{-1-}$ is released from its manually imposed open position, the pistons resume normal operation immediately.

This manual control is shown diagrammatically in FIGS. 3–6. Although where the rod 57 is manually actuated a resilient grommet desirably can be used for frictional control of rod 57 movement, thereby eliminating latching parts, the manual pull rod 57 is shown slidably mounted in a male gland nut 73 that is threaded in an opening 81 through the clamp plate 23 coaxial with the valve, $Vi_{1-1}$. The stem 56 for the valve is absent and the upper wall 83 is provided with an enlarged opening 85 to receive a chevron seal 87 therein held in place by the gland nut as supported by a washer 89 located between the spring 46 and the inner face of the upper wall. The pull rod as shown in FIGS. 3 and 4 has a detent 92 engaged by the spring end 94 of a goose neck clip 96, when the valve $Vi_{1-1}$ is pulled to its open position. The detent extends circumferentially only a short distance around the shaft so that the restraint of the engaged detent can be released by turning the rod as well as pushing it when it is desired to release the valve. A button handle 98 is provided on the outer end of the rod for manipulation of the rod. In FIG. 3 the valve is shown released with the rod serving as a guide for the valve similar to the guide 56 of $Vi_{1-2}$.

In FIG. 5 the rod 57a is of ferrous metal and serves as an armature that is actuated by a solenoid 100 having a C-shaped laminated core 102 containing a coil 104 that is energized by "line" current as controlled by a timer 106.

In FIG. 6 a counter 110 is used having a "set" wheel 112. The rod 57 in this embodiment reciprocates each time the valve $Vi_{1-1}$ is opened by the motor piston driven rod $Ri_{1-1}$ as when the rod is raised to the position shown in broken lines 114. A compression spring 116 between the lower end of the rod 57r and the head 47 of the piston raises the rod 57r each opening of the valve $Vi_{1-1}$. When the counter has counted down from a set number of strokes to "zero," a plunger 118 is released by the counter which engages in a notch 120 on the rod 56r and latches the rod to hold the valve open until the counter is again reset.

Thus, in many ways the rod 57 can be disposed in a position holding the valve $Vi_{1-1}$ open to stop the motor pistons MP from operating to permit plain water to run at full pressure through the device. Otherwise, the flow size of the valve port openings either in their coaction with motor pistons or the free flow do not limit the speed of the device at any flow rate nor drop the pressure across the device under free flow conditions.

Reference is now made to FIGS. 7 and 8 showing the construction and arrangement of the four identical pumps (two of which are not shown), carried by the cylinder blocks 40 to cooperate with the piston heads.

A hollow pump piston PP is carried by each cylinder head in both cylinder blocks and is in communication with the cross head manifold 53 which supplies the pump pistons with concentrate received through a nipple 55 (FIG. 1) from a source of supply 18 as already described. The pump pistons extend into the respective cylinders a distance sufficient to cooperate with the motor pistons MP throughout their movement and the motor pistons in turn are cored out with blind holes 64 to accommodate the pumping pistons.

The cored out holes 64 receive plastic pump cylinder sleeves 66 therein. Sleeves 66 are preferably fabricated of plastic containing a lubricant, such as the proprietary product Nylatron, sold by Polymer Corporation of Chicago, which is nylon impregnated with molybdenum disulfide ($MoS_2$). Other such products containing lubricants such as graphite and the molybdenum polysulfides e.g. MoSe and $MoS_4$ may be used. The outside diameter of the sleeves is greatly less than the holes 64 so that there is an exhaust passageway 68 clearance between them with longitudinal integral external ribs 69 supporting the cylinder sleeves 66 in spaced relationship to the wall of the holes 64. The cylinder sleeve can be press fitted with respect to the bore but preferably is threaded to secure the sleeve in the piston bore 64 in cooperating concentricity with the sleeve piston PP against inadvertent movement.

A button 74 is disposed at the inner end of the cylinder sleeve 66 having a grooved shank 77 receiving a V-ring seal 75. The seal is slidingly received in the end thereof to cooperate therewith in a dual capacity of a cylinder head and pump output check valve that normally closes the inner end thereof under the influence of a light compression spring 76.

A flanged sleeve member 78 is press fitted into the end of the sleeve piston PP and is provided with an internal shoulder 82 at the inner end thereof to help support the pump intake check valve disc 86. The disc element 86 closes against the end of the sleeve member as an inlet valve as urged in that direction by an involuted compression spring 88 interengaging the disc and the internal shoulder 82 of the inner end of the sleeve member 78. A groove-like space is left between the end of the sleeve piston and the flange of the sleeve member for the reception of a V-ring 84 therein that cooperates as a pump seal with the inner wall of the plastic sleeve cylinder 66 which surprisingly reduces to less than a third the friction and wear of resilient piston seals that would exist against metal.

Concentrate is ingested into the cylinder sleeve 66 through the inlet valve 86 on the retracting movement of the pump piston PP for substantially the full movement thereof and then is forced out therefrom into the motor cylinder MC through the outlet valve 74 and exhaust passage 68 around the sleeve cylinder 66 as the motor piston MP advances to exhaust diluent ahead of it. Thus, concentrate is injected in exact proportions into the motor cylinder with each discharge of diluent by the motor pistons.

As each pump piston PP approaches the end of its movement the intake valve 86 engages and opens the outlet valve 74 enough to release any compressed air that may be trapped between them and thereby assures a quick and full prime. Otherwise there would be a substantial back pressure of diluent against the outlet valve 74 whereby a full evacuation of such air might be inhibited. This is significant since the concentrates are changed from time to time and full priming immediately is desirable with the first couple of strokes of the motor piston for quick and accurate proportioning with changed concentrates. Air could expand and contract endlessly in the pump cylinder 66 without the outlet valve 74 being positively opened against high cylinder pressures. The assured discharge of entrapped gas each stroke is replaced by some concentrate intake and within two to four strokes and otherwise air bound pump is fully primed. Thereafter, the pump is capable of lifting concentrate a substantial distance by developing a partial vacuum or negative gauge pressure as low as 3 lbs. per square inch, absolute, without changing the resulting output volume of the concentrate each stroke.

It will be observed also (FIG. 3) with respect to the planes B and D of separation indicated between the valve and cylinder blocks 40 and 50 that the concentrate piston PP protrudes beyond the valve blocks 40 for the ready visual assembly of the elements associated therewith as described, and further, either one or both concentrate manifolds can be connected to sources of concentrates for progressive and simultaneous admixture thereof in the diluent directly in the motor cylinders during the strokes that exhaust the diluent and concentrate as already described. Whether the motor runs fast or slow, depending on the external valving of the mixture output, the proportioning and mixing factors are constant for any set of conditions or flow speeds.

Whenever the reciprocation of the motor and pump pistons is stopped by holding the motor valve $Vi_{1-1}$ open, it will be appreciated that inlet pressure will be present at the pump valves 74 and 86, the pump exhaust valve 74 and $PP_{2-2}$ being held open and both valves 74 and 86 of $PP_{2-1}$ being closed due to the position of the piston $P_2$ under stopped conditions described. Either one or both of these pump valves will prevent movement of water into the pump pistons even though pressure of chemical therein is at atmospheric pressure or below. Thereby dilution of the chemical with water as well as flow of chemical into the water is fully arrested for the duration of the time the valve $Vi_{1-1}$ is held open.

Having thus set forth the objects and described a preferred embodiment of the invention with its novel arrangement of parts and results attained, it will be seen how the stated objects are attained, particularly in the safe handling of horticultural chemicals by home owners, and how various modifications and changes can be made therein including alternate flow control of water and chemical mixtures at any rate of flow desired.

What is claimed is:

1. In a fluid proportioning device, a housing having an inlet and outlet
   conduit means interconnecting said inlet and outlet for the flow of one fluid under pressure therethrough and including spaced intake valve means and outlet valve means and a manifold interconnecting said valve means,
   motor means including a piston and cylinder reciprocated with respect to each other by said one fluid under pressure flowing through said manifold and opening one of said valve means during their relative reciprocation,
   conduit means for a second fluid connected at its outlet to the first mentioned conduit means and including pump means operated by said motor means having intake and exhaust valves opening towards said outlet to induce flow and exhaust said other fluid therethrough for mixing said fluids, and
   means manually moved to engage and open the other of said valve means at will to actuate said motor means to open said one of said valve means and place the inlet and outlet in open direct communication through said manifold.

2. The combination called for in claim 1 in which said intake valve means and outlet valve means open in a direction opposite to the direction of flow through said conduit means.

3. The combination called for in claim 1 in which said one of said valve means is the outlet valve means.

4. The combination called for in claim 1 including control means for controlling the reciprocation of said motor means including inlet and exhaust valves that are normally closed when said motor means is at its limit of excursion in which it opens said one of said valve means.

5. The combination called for in claim 4 in which said control means includes
 a second piston-cylinder means connected to and reciprocated in part by the first mentioned piston and cylinder and controlled by said intake and outlet valves equalizing pressures on opposite sides of said motor means to hold said second piston-cylinder means at its midstroke when said manual means is actuated.

6. In a fluid proportioning device,
 a housing having an inlet and outlet,
 conduit means interconnecting said inlet and outlet for the flow of one fluid under pressure therethrough and including spaced intake valve means and outlet valve means and a manifold interconnecting said valve means,
 motor means including a piston and cylinder reciprocated with respect to each other by said one fluid under pressure flowing through said manifold to engage and open said valve means alternately during the terminal halves of their respective reciprocation,
 conduit means for a second fluid connected at its outlet to the first mentioned conduit means and including pump means operated by said motor means having intake and exhaust valves opening towards said outlet to induce flow of and exhaust said other fluid therethrough for mixing said fluids, and
 means manually moved to open said intake valve means at will to place the inlet and outlet in open direct communication through said manifold when said motor means opens said outlet valve means.

7. In a fluid proportioning device,
 a housing having an inlet and outlet, a plurality of conduit means each interconnecting said inlet and outlet for the flow of one fluid under pressure therethrough and each including a pair of spaced inlet valve means and outlet valve means interconnected by a manifold,
 motor means including coacting piston element and cylinder element,
 means for reciprocating one element with respect to the other element for alternately opening the inlet valve means and outlet valve means of each pair,
 said motor means pistons having pump cylinders for another fluid, pump pistons mounted in said motor means cylinders, pump valves between said pump cylinders and pump piston closing under pressure in said motor means cylinders,
 and manual means movable to engage and open the inlet valve means of one pair at will to actuate said motor means to open the inlet valve means of the other pair to equalize fluid pressures between the manifolds.

8. The combination called for in claim 7 including means responsive to a differential in pressure between said manifolds for actuating said motor means.

9. In a fluid proportioning device,
 a housing having an inlet and outlet,
 a plurality of conduit means each interconnecting said inlet and outlet for the flow of one fluid under pressure therethrough and each including a pair of spaced inlet valve means and outlet valve means interconnected by a manifold,
 motor means including a piston and cylinder reciprocated by said one fluid for alternately opening the inlet valve means and outlet valve means of each pair,
 manual means movable to engage and open the inlet valve means of one pair at will when said motor means opens the inlet valve means of the other pair to equalize fluid pressures between the manifolds,
 and conduit means for a second fluid connected to said plurality of conduit means for mixing the fluids and including pump means operated by said motor means including intake and exhaust valve closing in the direction of backflow of fluid therethrough.

10. The combination called for in claim 7 in which said motor means includes a plurality of pistons and cylinders defined in which a motor piston is disposed in each cylinder with the pistons interconnected in pairs that are disposed in axially aligned cylinders each connected to one of said manifolds, means interconnecting the pairs of interconnected pistons in unitized relationship wherein one piston unit is halfway through its stroke when the other piston unit is at the end of its stroke, each of said inlet valve means conducting fluid under pressure from the inlet to the manifold of each cylinder whose valve means are controlled by the piston unit operating in the other pair of cylinders during a reciprocation excursion of the latter piston unit in one direction from its midpoint back to its midpoint, and each of said exhaust valve means discharging the same manifold for each cylinder to the outlet as controlled by the latter piston unit during its reciprocation excursion in the opposite direction from its midpoint back to its midpoint.

11. The combination claimed in claim 9 in which said pump means includes a pump cylinder cavity in the body of the motor pistons, a pump piston supported on the head of the motor cylinder coaxial with said pump cylinder cavity, and outlet means from the pump cylinder cavity through the body of the motor piston into the motor cylinder.

12. A fluid proportioning device comprising a housing having two motor cylinders therein, a motor piston reciprocably mounted in each cylinder, means interconnecting said pistons for coordinating their movement wherein one piston is halfway through its stroke when the other piston is at the end of its stroke, an inlet valve means for diluent fluid under pressure for each cylinder controlled by the piston moving in the other cylinder during its reciprocation excursion in one direction from its midpoint back to its midpoint, and exhaust valve means for exhausting each cylinder controlled by said piston in the other cylinder during its reciprocation excursion from said midpoint back to said midpoint in the opposite direction, pump means actuated by each piston for drawing concentrate fluid from a concentrate inlet and discharging the concentrate fluid into the diluent discharged from the cylinder of that piston, and manual means engaging and opening one of said inlet valve means for one of the cylinders when the inlet valve means for another cylinder is opened by movement of the piston in said one of the cylinders.

13. A fluid proportioning device comprising a housing having four motor cylinders therein opposing each other in two axially aligned pairs, a motor piston in each cylinder with the pistons interconnected in pairs that are disposed in the axially aligned cylinders, means interconnecting the pairs of interconnecting pistons for coordinating their movement wherein one piston pair is halfway through its stroke when the other piston pair is at the end of its stroke, an inlet valve means for diluent fluid under pressure for each cylinder controlled by the piston pair operating in the the other pair of cylinders during a reciprocation excursion of such piston pair in one direction from their midpoint back to their midpoint, and exhaust valve means for discharging each cylinder controlled by the piston pair operating in the other pair of cylinders during its reciprocation excursion in the opposite direction from its midpoint back to its midpoint, pump means actuated by each piston for drawing a chemical fluid through an inlet back flow check valve and discharging it into the output from the cylinder of that piston, and manual means actuatable to engage and open one of said inlet valve means for one of said cylinders of one pair when the exhaust valve means for that cylinder is opened by a piston pair operating in the other pair of cylinders.

14. In a fluid proportioning device,
a housing having an inlet and an outlet,
a plurality of conduit means interconnecting said inlet and outlet for the flow of one fluid under pressure through one of said conduit means,
motor means driven by said fluid pressure,
valves in another of said conduit means actuated by said motor means to open one valve and close another valve in said conduit means for controlling the flow of fluid therethrough,
pump means driven by said motor means connected to a third conduit means, valves in said third conduit means for controlling the flow of fluid therethrough to said one conduit means and closing under pressure in said one conduit means,
and manually controlled means engaging said closed valve in the other of said conduit means to open it for by-passing flow from the inlet to the outlet through said other conduit means when said one of the valves in said other conduit means is opened by said motor means.

References Cited
UNITED STATES PATENTS 3,330,290    7/1967    Porter _____ 137—99

ALAN COHAN, Primary Examiner

H. M. COHN, Assistant Examiner

U.S. Cl. X.R.
91—437; 222—263